United States Patent Office 3,342,811
Patented Sept. 19, 1967

3,342,811
STEROIDAL AMINES AND AMIDES, AND PROCESS FOR THE PREPARATION OF SAME
Shalom Sarel, Yehuda Yanuka, and Yehuda Shalon, all c/o School of Pharmacy in conjunction with the Hebrew University—Hadassah Medical School, P.O. Box 1172, Jerusalem, Israel
No Drawing. Continuation of application Ser. No. 385,760, July 28, 1964. This application Jan. 13, 1967, Ser. No. 609,260
Claims priority, application Israel, Dec. 5, 1963, 20,379
17 Claims. (Cl. 260—239.5)

This is a continuation of copending application Ser. No. 385,760, filed July 28, 1964, now abandoned.

The present invention consists in novel derivatives of perhydro cyclopentano phenantrene of Formula I

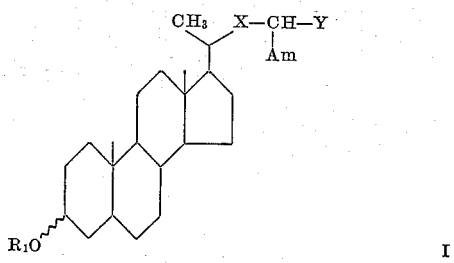

I in which X is either a carbon-to-carbon bond or an alkylene radical, $R_1$ is hydrogen, a lower alkyl or an acyl radical, Am is an amine or ammonium radical and Y is hydrogen, carboxyl or a functionally modified carboxyl, and the perhydrocyclopentano phenantrene ring system may be further substituted.

The novel compounds of this invention have been found to possess valuable pharmaceutical properties, such as anti-amoebic activity.

For the preparation of the compound according to the invention compounds of Formula II

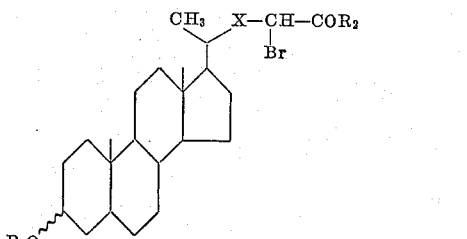

II are used as starting materials. In this formula X and $R_1$ have the same meanings as in Formula I and $R_2$ stands for OH, halogen or the radical of an aliphatic, arylaliphatic or cycloaliphatic alcohol.

According to one method for the preparation of compounds of Formula I that are amines or ammonium salts (Y=H), the above starting compound II is reacted in the heat with a liquid amine such as pyridine, which results in decarboxylation and formation of a compound of the general formula

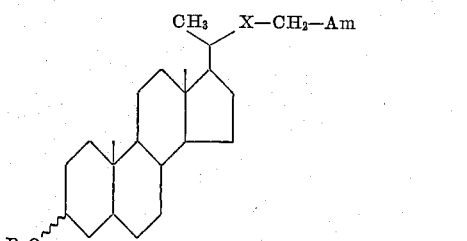

III in which X, Am and $R_1$ have the same meanings as in Formula I.

By another method for the preparation of compounds of Formula I that are of a Zwitterionic character, a compound of the above Formula II in which $R_2$ is OH (i.e. a free carboxylic acid) is reacted with an amine in an inert organic solvent, preferably in the heat. The products of this reaction correspond to Formula IV

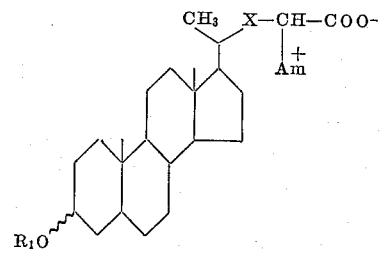

IV in which X, Am and $R_1$ have the same meanings as in Formula I.

By yet another process for the preparation of compounds of Formula I that are α-amino-acid amides, the compound of Formula II used as starting material is an acid halide ($R_2$=halogen). In accordance with this method, the starting material is first reacted with an amine to produce an α-bromo-amide of Formula V

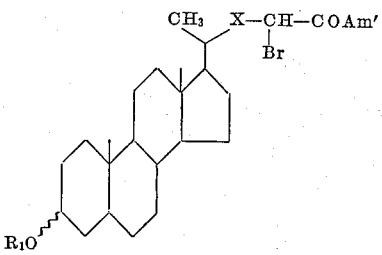

V in which X and $R_1$ have the same meanings as in Formula I and Am' is an amino radical, and this compound V is then further reacted with either the same or a different amine to yield an α-amino-amide of Formula VI

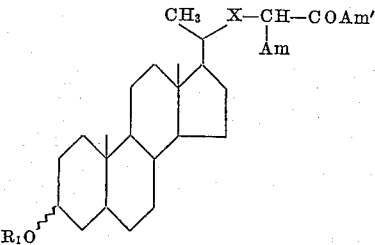

VI in which X, Am, Am' and $R_1$ have the same meanings as above.

The compounds of the above Formula II used as starting materials are prepared by reacting a compound of the Formula VII

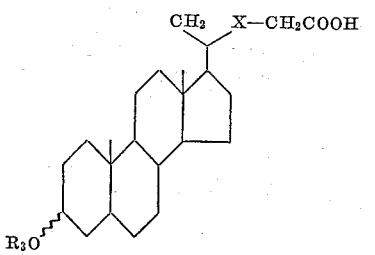

VII in which X has the same meaning as in Formula I and $R_3$ is lower alkyl or acyl with elementary bromine in a thionyl chloride solution and, if desired, submitting the resulting α-bromo compound to hydrolysis or alcoholysis. If desired, the bromination may be carried out in the presence of an acidic or basic catalyst such as for example hydrohalic acid, an organic base such as pyridine or lutidine, acid addition salts of organic bases such as pyridinium hydrobromide and others. The bromination may also be effected with pyridinium hydrobromide perbromide.

The above α-bromination of compound VI can be carried out by dissolving the starting materials in a suitable amount of thionyl chloride, if desired heating the solution, and then gradually adding to the solution a thionyl chloride solution of bromine, if desired together with a catalyst. The reaction vessel must be completely dry and during the reaction suitable measures must be taken for the exclusion of humidity. In the course of the bromination reaction, thionyl chloride apparently reacts with the carboxylic group to form the corresponding acid chloride. The acid chloride then reacts with bromine to form the corresponding α-bromo acid chloride and the latter is then submitted, if desired, to hydrolysis or alcoholysis to yield, respectively, the corresponding free α-bromo acid or α-bromo ester.

The invention is illustrated by the following examples to which it is not limited.

EXAMPLE 1

*Preparation of compounds of Formula II*

(a) *Preparation of 3α-acetoxy-22 - bromo-norcholanic acid methyl ester.*—3 g. of 3α-acetoxy-norcholanic acid methyl ester was placed in a flask provided with a dropping funnel, a reflux condenser sealed with a calcium chloride tube and a duct linking the lower part of the reflux condenser with the upper part of the dropping funnel. 4 cc. of thionyl chloride was added through the dropping funnel and the mixture heated for one hour to 40–60° C. Thereafter the temperature was raised to 70° C. and a solution of 0.44 cc. of bromine in 2 cc. of thionyl chloride (about 10% excess of bromine) added dropwise through the dropping funnel. The rate of addition of the bromine was equal to the rate of bromine consumption in the course of the reaction. After 24 hours the flask was cooled with ice water, 20 cc. of dry methanol added through the dropping funnel and the mixture left to stand overnight. Thereafter the solvents were removed in vacuo and 25 cc. of ether added. There resulted a turbid solution from which after some time almost colourless crystals precipitated. The precipitate was purified by chromatography on an alumina with benzene as solvent. 3α-acetoxy-22-bromo-norcholanic acid methyl ester was obtained in the form of colourless crystals melting at 220° C.

*Analysis.*—Calculated for $C_{26}H_{41}O_4Br$: C, 62.77%; H, 8.30%. Found: C, 62.32%; H, 8.84%.

The yield was not quite constant and varied between the experiments. Yields as high as 50% were obtained.

(b) *Preparation of 3β-acetoxy-22 - bromo-norcholanic acid methyl ester.*—The compound was prepared from 3β-acetoxy-norcholanic acid methyl ester in analogy to the α-epimer described in the preceding example.

Refluxing of either of the two epimers for 24 hours in a 1 N potassium hydroxide solution in 1/1 alcohol-water mixture resulted in hydrolysis into 3α(β)-22-dihydroxy-norcholanic acid.

(c) *Preparation of 3α-acetoxy-22 - bromo-norcholanic acid.*—3.4 g. of 3α-acetoxy-norcholanic acid were placed in a similar device as used in the preceding Example 1(a). 4 cc. of thionyl chloride was added through the dropping funnel and the mixture heated for one hour to 40–60° C. Thereafter a solution of 0.5 cc. of bromine and 0.75 cc. of pyridine in 3 cc. of thionyl chloride was added dropwise through the dropping funnel. The rate of bromine addition was in line with the rate of bromine consumption. After five hours of heating at 40–60° C. the reaction was completed and the solvents evaporated in vacuo. The residue was dried in vacuo at 50° C., cooled and admixed with 10 cc. of cold acetone. The mixture was stirred with a glass rod and crystals precipitated. The precipitate was filtered off and washed several times with 3 cc. portions of cold acetone. The crystals were then immediately dried in vacuo at 100° C. In this manner 2 g. of 3α-acetoxy-22-bromo-norcholanic acid was obtained in a yield of 50%. M.P. 198–200° C.

To the cold filtrate there was added at once 100 cc. of water and the mixture extracted with chloroform. The chloroform extract was carefully washed with water and then concentrated to a volume of 10 cc. 100 cc. of carbon tetrachloride was added and the solution passed through a column of 30 g. silica gel (diameter 2 cm. length 30 cm.). The column was first eluted with carbon tetrachloride until this solvent did not elute any further substance. The column was then eluted with a mixture of 100 parts of carbon tetrachloride and 30 to 100 parts of chloroform. There was obtained 3α-acetoxy-22-bromo-norcholanic acid in the form of crystals melting between 210 and 230° C. Yield 1.2 g.

The acid chloride obtained as described above was hydrolyzed with an acetone-water mixture which yielded 3α-acetoxy - 22 - bromo-norcholanic acid. This product was identical with the one obatined from the mother liquor of the acid chloride.

The unsharp melting point of the 22-bromo acid is to be explained by the fact that the product is a mixture of two epimers in which the 22-bromo atom is of different configuration. By repeated chromatographic separation on silica gel and elution with chloroform-carbon tetrachloride, the acids could be separated into the three following fractions.

Fraction 1: elution with a mixture of 100 parts carbon tetrachloride and 30 parts of chloroform which yielded about one-third of the starting material; M.P. 200–215° C.

Fraction 2: elution with a mixture of 100 parts carbon tetrachloride and 60 parts of chloroform yielding another third of the product; M.P. 216–220° C.

Fraction 3: elution with pure chloroform yielding another third of the product; M.P. unsharp between 200–220° C.

(d) *Preparation of 3α - acetoxy - 23 - bromo-cholanic acid.*—A solution of 10 g. of 3α-hydroxy-cholanic acid in 100 cc. of glacial acetic acid containing 2% by weight of acetic anhydride was refluxed for 48 hours. After cooling, the 3a-acetoxy-cholanic acid precipitated in the form of colourless crystals melting at 170–171° C.

3 g. of the above acetyl compound were introduced into the same device as used in Example 1(a). 4 cc. of thionyl chloride were added through the dropping funnel and the mixture heated for one hour at 40–60° C. The temperature was then raised to 70° C. and a solution of 0.44 cc. of bromine (10% excess) in 0.66 cc. of pyridine in 4 cc. of thionyl chloride was added. The rate of addition corresponded to the rate of bromine consumption by the reaction. After heating for five hours at 70° C. the solvents were evaporated in vacuo. The residue was cooled with ice water and 20 cc. of cold water was added. The resulting solution was extracted with chloroform and the chloroform extract washed with water. The extract was dried over sodium sulphate and the chloroform removed by distillation.

The product was purified by chromatography on silica gel, using for the elution various mixtures of chloroform and carbon tetrachloride. The product was crystallized from acetone-petroleum ether, giving 2.5 g. (71%) of colourless crystals melting at 213–215° C.

Similar results were obtained when using for the bromination pyridinium hydrobromide perbromide instead of pyridine and bromine. The procedure was as follows:

5 g. of 3α-acetoxy-cholanic acid was admixed with 4 g. of pyridinium-bromide perbromide (M.P. 132–134° C.) and to it was added with shaking 10 cc. of thionyl chloride. The mixture was heated at 60–65° C. for 8 hours and then the excess thionyl chloride was removed by distillation at reduced pressure. The residue was extracted with chloroform, the extract washed with water and aqueous sodium bisulphite solution and dried over sodium sulphate. After concentration of the chloroform solution to a volume of 10 cc., 300 cc. of carbon tetrachloride was added and the solution then chromatographed over silica gel, yielding 5.41 g. (90–91% yield) of 3α-acetoxy-23-bromo-cholanic acid. Recrystallization from acetone-petroleum ether yielded colourles crystals, M.P. 213–215° C.

*Analysis.*—Calculated for $C_{26}H_{41}BrO_4$: Br, 16.10%. Found: Br, 16.26%.

I.R. Spectrum (KBr): 2941, 1729, 1460, 1389, 1266–1250, 1176, 1053 and 990 cm.$^{-1}$.

The preparation of the 3β-epimer of any of the compounds described in Example 1(c) to 1(d) is effected in a completely analogous manner.

EXAMPLE 2

*Preparation of 3α-acetoxymorphilinium norcholanic acid*

A mixture of 200 mg. of 3α-acetoxy-22-bromo-norcholanic acid, 2 cc. of morpholine, and 15 cc. of dry benzene was refluxed for 10 hours. On cooling, morpholinium bromide (M.P. 213°) separated as crystalline product (in quantitative yield). It was filtered, washed with benzene, and the benzene from the washing was added to the previous filtrate. From the combined filtrate the solvent was removed. The residue was dissolved in chloroform, the solution washed with dilute hydrochloric acid (4%) and water, and thereafter the solvent was removed by distillation. The residue was dissolved in 1 cc. methanol and 2 cc. of methanolic hydrogen chloride (2%) was added. The solvent was removed by evaporation and the residue was recrystallized from acetone. M.P. 255° C. Yield: 75%.

*Analysis.*—Calculated for $C_{29}H_{48}NO_5 \cdot HCl$: Cl, 6.7%. Found: Cl, 6.7%.

I.R. Spectrum (KBr): 3333, 2857, 1724, 1639, 1471–1429, 1408–1370, 1274–1250, 1220, 1042, 990, 895 cm.$^{-1}$.

EXAMPLE 3

*Preparation of 3α-acetoxy-22-trimethylammonium-norcholanic acid*

To a solution of 0.5 g. of 3α-acetoxy-22-bromo-norcholanic acid in 20 cc. of dry benzene was added 5 cc. of a 33% ω/ω alcoholic solution of trimethylamine and the reaction mixture was refluxed for 24 hours. Thereafter the solvent was removed in vacuo, the residue dried at 100° C., the dry residue taken up in chloroform, the chloroform solution washed with water to remove any residual trimethylamine and then dried over sodium sulphate. After drying the solvent was removed and 50 cc. of benzene added to the residue. The mixture was heated and then allowed to cool whereupon 305 mg. of the product precipitated. Yield 70%. M.P. 180° C.

*Analysis.*—Calculated for $C_{28}H_{48}NO_4$: N, 3.02%. Found: N, 2.95%.

I.R. Spectrum (KBr): 3333, 2941–2857, 1748–1724, 1639, 1471, 1376, 1266, 1042, 830–810 cm.$^{-1}$.

Some additional amounts of the compound could be recovered from the benzenic mother liquor. Overall yield: 80%.

EXAMPLE 4

*Preparation of 3α-acetoxy-bis-norcholanyl-pyridinium bromide*

300 mg. of 3α-acetoxy-22-bromo-norcholanic acid were admixed with 15 cc. of pyridine and the reaction mixture was refluxed for 24 hours. Thereafter the solvent was removed in vacuo and the residue dissolved in a small amount of methanol. The reaction product was precipitated by addition of benzene, redissolved in methanol and again precipitated by the addition of a small amount of benzene until the occurrence of a slight turbidity. The solution was left to stand for some time and the product precipitated in the form of colourless glossy crystals. Yield 90%. M.P. 276–277° C.

*Analysis.*—Calculated for $C_{29}H_{44}O_2BrN$: C, 77.16%; H, 8.56%; N, 2.7%. Found: C, 76.96%; H, 8.61%; N, 2.7%.

The U.V. Spectrum showed an absorption band at 260 mμ which corresponds to N-alkylpyridinium.

I.R. Spectrum (KBr): 3448, 2941–2924, 1736(CO), 1639(C=C), 1488–1466, 1374, 1276–1256(CO), 1176, 1033 (CH-aromatic) cm.$^{-1}$.

Instead of using the free acid as starting material, it is also possible to use an ester, e.g. the methyl ester. This was done by refluxing 0.5 g. of 3α-acetoxy-22-bromo-norcholanic acid methyl ester together with 15 cc. of pyridine for 24 hours. Thereafter the solvent was evaporated in vacuo and the residue extracted with ether. The crystalline residue was identical in all respects with the above described 3α - acetoxy-bis-norcholanyl-pyridinium bromide. Yield 30%. M.P. 276–277° C.

EXAMPLE 5

*Preparation of 3β-acetoxy-bis-norcholanyl-pyridinium iodide*

500 mg. of 3β-acetoxy-22-bromo-norcholanic acid was dissolved in 15 cc. of pyridine, 500 mg. of sodium iodide was added to the solution and the reaction mixture refluxed for 24 hours. Thereafter the solvent was removed by distillation at reduced pressure and the residue was suspended in water, filtered off, dried and dissolved in 2 cc. of methanol. After addition of benzene 500 mg. of 3β-acetoxy-bis-norcholanyl-pyridinium iodide crystallized. M.P. 260–265° C.; yield 90%.

*Analysis.*—Calculated for $C_{29}H_{44}O_2IN$: C, 65.58%; H, 7.85%. Found: C, 61.43%; H, 7.7%.

The U.V. absorption spectrum showed an absorption band at 260 mμ which indicates the presence of pyridine in the molecule, and a further band at 218–222 mμ which is characteristic for the presence of iodide.

I.R. Spectrum (KBr): 3401, 2941, 1639(C=C), 1493–1449, 1168, 1042, 770(CH aromatic) cm.$^{-1}$.

EXAMPLE 6

*Preparation of 3-acetoxy-norcholanyl-pyridinium bromide*

0.5 g. of 3α-acetoxy-23-bromo-cholanic acid were admixed with 20 cc. of pyridine and the reaction mixture was refluxed for 24 hours. In the course of the reaction the mixture assumed a dark brown coloration. After 24 hours the solvent was removed in vacuo and the residue taken up in a small amount of methanol. Benzene was added to the solution until occurrence of a slight turbidity. The solution was left to stand for some time and the product precipitated in the form of colourless crystals melting at 279° C. Yield 90%.

*Analysis.*—Calculated for $C_{30}H_{46}O_2NBr$: Br, 15.0%; N, 2.63%. Found: Br, 15.0%; N, 2.63%.

The U.V. absorption spectrum showed an absorption band at 260 mμ which is characteristic for the presence of pyridine in the molecule.

I.R. Spectrum (KBr): 3448–3289, 2941–2810, 1653 (C=C), 1488–1462, 1381, 1323, 1176, 1075, 1042, 770 (CH aromatic) cm.$^{-1}$.

The same product was obtained under similar conditions when using the methyl ester as starting material instead of the free acid.

When the reaction was carried out in the presence of sodium iodide as described in Example 5, using as starting material either the free acid or the methyl ester, the product was 3α-acetoxy-norcholanyl-pyridinium-iodide. M.P. 260° C.

The U.V. absorption spectrum showed an absorption band at 260 mμ which indicated the presence of a pyridine group in the molecule, and a band at 218–222 mμ which is characteristic for the presence of iodine.

EXAMPLE 7

*Preparation of 3α-acetoxy-23-morpholinium-cholanic acid*

1 g. of 3α-acetoxy-23-bromo-cholanic acid was dissolved in 30 cc. of dry benzene and 5 cc. of morpholine was added. The reaction mixture was then refluxed for 24 hours. Already at the beginning of the reaction morpholine hydrobromide began to precipitate. After the completion of the reaction the solution was separated from the precipitated crystals, the solvent evaporated to dryness, the residue taken up in chloroform and the chloroform solution washed first with 1 N aqueous hydrochloric acid and then with water. The solution was then dried over sodium sulphate and after drying the chloroform was removed by evaporation. The residue was repeatedly crystallized from acetone which yielded the product in the form of colourless crystals melting at 212° C. Yield 86%.

*Analysis.*—Calculated for $C_{30}H_{49}O_5N$: N, 2.78%. Found: N, 2.60%.

I.R. Spectrum (KBr): 3571, 3030, 2941, 1754, 1613, 1449, 1381–1250(CO), 1111, 1087, 1064, 1029 cm.$^{-1}$.

The hydrochloride was prepared by dissolving 1 g. of 3α-acetoxy-23-morpholinium-cholanic acid in 5 cc. of methanol and adding 10 cc. of methanolic hydrogen chloride (2%) to the solution removing the solvent and recrystallizing the residue from acetone. M.P. 278–280° C. Yield—quantitative.

*Analysis.*—Calculated for $C_{30}H_{49}O_5N \cdot HCl$: Cl, 6.5%; N, 2.59%. Found: Cl, 6.5%; N, 2.59%.

EXAMPLE 8

*Preparation of 3α-acetoxy-23-trimethylammonium-cholanic acid*

When using the same starting material as in Example 7 and trimethyl amine instead of morpholine the homologous 23-trimethyl ammonium salt was obtained in an 80% yield. M.P. 236–238° C.

*Analysis.*—Calculated for $C_{29}H_{49}O_4N$: N, 2.94%. Found: N, 2.74%.

I.R. Spectrum (KBr): 3333, 2941–2857, 1748–1724, 1639, 1471, 1376, 1266, 1042, 830–810 cm.$^{-1}$.

EXAMPLE 9

*Preparation of 3α-acetoxy-23-bromo-cholanic acid morpholide*

1 g. of 3α-acetoxy-23-bromo-cholanic acid was dissolved in 50 cc. of dry benzene, 1 cc. of thionyl chloride was added to the reaction mixture, and the mixture was refluxed for five hours. The reaction mixture was then cooled, 4 cc. of morpholine was added at room temperature while shaking, and the mixture was left to stand for two hours with occasional shaking. Thereafter the mixture was extracted with benzene, the benzene extract washed first with water then with dilute hydrochloric acid, thereafter with a 1 N aqueous potassium hydroxide solution and finally with water. The solution was then dried over sodium sulphate and thereafter the solvent removed by evaporation. The residue was dissolved in chloroform and an equal volume of carbon tetrachloride was added. The solution was chromatographed on a 20 g. alumina column, elution being effected with the same solvent mixture. After removal of the solvent and repeated crystallization from acetone/methanol the product was obtained in the form of colourless crystals of M.P. 160° C. Yield 93%.

*Analysis.*—Calculated for $C_{30}H_{48}O_4Br$: Br, 14.1%. Found: Br, 14.5%.

I.R. Spectrum (KBr): 3390, 2882, 1727, 1653, 1449, 1370, 1250, 1124–1105, 1031 cm.$^{-1}$.

EXAMPLE 10

*Preparation of 3α-acetoxy-22-bromo-norcholanic acid morpholide*

By processing 1 g. of 3α-acetoxy-22-bromo-norcholanic acid in the manner described in Example 9, 3α-acetoxy-22-bromo-norcholanic acid morpholide is obtained in quantitative yield, M.P. 140° C.

*Analysis.*—Calculated for $C_{29}H_{46}O_4N$ Br: C, 63.04%; H, 8.34%; Br, 14.44%; N, 2.53%. Found: C, 62.94%; H, 7.95%; Br, 14.58%; N, 2.50%.

I.R. Spectrum (KBr): 3333, 2907, 1730, 1661, 1441, 1389, 1258, 1124, 1031 cm.$^{-1}$.

EXAMPLE 11

*Preparation of 3α-acetoxy-23-morpholino-cholanic acid morpholide*

0.5 g. of the morpholide prepared in accordance with Example 9 was dissolved in 15 cc. of morpholine and 1.5 cc. of water and the reaction mixture refluxed for 43 hours. Thereafter the solvent was removed in vacuo, the residue taken up in chloroform, and the chloroform solution washed first with dilute hydrochloric acid and then with water. The solution was then dried over sodium sulphate and thereafter the solvent was again removed leaving behind 350 mg. (70%) of the product. It was characterized in the form of its hydrochloride, M.P. 265° C.

*Analysis.*—Calculated for $C_{34}H_{56}O_5N_2 \cdot HCl$: N, 4.6%; Cl, 5.82%. Found: N, 4.6%; Cl, 5.8%.

I.R. Spectrum (KBr): 3333, 2817, 1653, 1471, 1408–1370, 1250, 1124, 1053 cm.$^{-1}$.

EXAMPLE 12

*Preparation of 3α-acetoxy-23-pyridino-cholanic acid morpholide*

The procedure of Example 11 was repeated, using pyridine instead of morpholine. The product was soluble in water. Yield 90%. M.P. 200° C. (decomp.).

*Analysis.*—Calculated for $C_{35}H_{53}O_4N_2Br$: Br, 12.2%; N, 4.34%. Found: Br, 12.2%; N, 4.33%.

I.R. Spectrum (KBr): 3597, 3077, 2985, 1754, 1667, 1493, 1460, 1389, 1370, 1250, 1170, 1117, 1031 cm.$^{-1}$.

It should be noted that while the preceding examples the preparation of either the 3α- or the 3β-epimer is described, the opposite epimers can be prepared in exactly the same manner.

What is claimed is:

1. Novel derivatives of perhydro cyclopentanophenantrene of Formula I

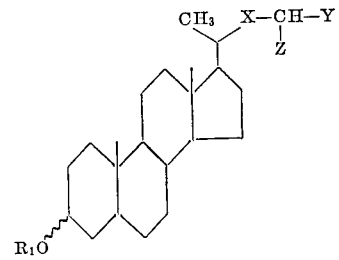

in which X is selected from the group consisting of an alkylene radical and a carbon-to-carbon bond, $R_1$ is a member of the group consisting of lower alkyl and lower acyl radicals, Z is a member of the group consisting of bromine, amine and ammonium radicals and Y is a member of the group consisting of hydrogen and —$COR_2$, wherein $R_2$ is selected from the group consisting of hydroxyl, halogen, amine, ammonium radical, and a radical of an aliphatic, aryl-aliphatic and cyclo-aliphatic alcohol.

2. 3-acetoxy-22-morpholinium-norcholanic acid, in accordance with claim 1.

3. 3-acetoxy-22-trimethylammonium-norcholanic acid, in accordance with claim 1.

4. 3-acetoxy-bis-norcholanyl-pyridinium bromide, in accordance with claim 1.

5. 3-acetoxy-bis-norcholanyl-pyridinium iodide, in accordance with claim 1.
6. 3-acetoxy-norcholanyl-pyridinium bromide, in accordance with claim 1.
7. 3-acetoxy-norcholanyl-pyridinium iodide, in accordance with claim 1.
8. 3-acetoxy-23-morpholinium-cholanic acid, in accordance with claim 1.
9. 3-acetoxy-23-trimethylammonium-cholanic acid, in accordance with claim 1.
10. 3-acetoxy-23-bromo-cholanic acid morpholide, in accordance with claim 1.
11. 3-acetoxy-22-bromo-norcholanic acid morpholide, in accordance with claim 1.
12. 3-acetoxy-23-morpholino-cholanic acid morpholide, in accordance with claim 1.
13. 3-acetoxy-23-pyridino-cholanic acid morpholide, in accordance with claim 1.
14. Process for the preparation of compounds as defined in claim 1, that are selected from the group consisting of amines and ammonium salts, wherein a compound of Formula II given herein is reacted in the heat with a liquid amine.
15. Process for the preparation of compounds as defined in claim 1, wherein a compound of Formula II given herein, that is an acid, is reacted with an amine in an inert organic solvent.
16. Process for the preparation of compounds as defined in claim 1 that are $\alpha$-bromo acid amides, wherein a compound of Formula II given herein, that is an acid, is reacted with thionyl chloride in an inert organic solvent and the resulting $\alpha$-bromo acid chloride is reacted with an amine.
17. Process for the preparation of compounds as defined in claim 1 that are $\alpha$-amino-acid-amides, wherein the corresponding $\alpha$-bromo-acid amide is reacted with an amine in an inert organic solvent.

No references cited.

ELBERT L. ROBERTS, *Primary Examiner.*